US012627742B2

(12) United States Patent
Mehta et al.

(10) Patent No.: US 12,627,742 B2
(45) Date of Patent: May 12, 2026

(54) RIC ARCHITECTURE WITH PLATFORM EXTENSION AND ADAPTERS

(71) Applicant: Boost SubscriberCo L.L.C., Englewood, CO (US)

(72) Inventors: Dhaval Mehta, Aldie, VA (US); Siddhartha Chenumolu, Ashburn, VA (US); Sourabh Gupta, Ashburn, VA (US); Sagar Narendrakumar Patel, Dublin, CA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 38 days.

(21) Appl. No.: 18/515,957

(22) Filed: Nov. 21, 2023

(65) Prior Publication Data

US 2025/0168244 A1     May 22, 2025

(51) Int. Cl.
| | |
|---|---|
| *H04L 67/00* | (2022.01) |
| *H04L 41/16* | (2022.01) |
| *H04L 67/53* | (2022.01) |

(52) U.S. Cl.
CPC .............. *H04L 67/34* (2013.01); *H04L 67/53* (2022.05); *H04L 41/16* (2013.01)

(58) Field of Classification Search
CPC ................................ H04L 67/34; H04L 67/53
See application file for complete search history.

(56) References Cited

U.S. PATENT DOCUMENTS

| | | | |
|---|---|---|---|
| 2015/0089297 A1* | 3/2015 | Johnson .............. | G06F 11/3698 |
| | | | 714/38.1 |
| 2016/0284009 A1* | 9/2016 | Shah .................. | G06Q 10/1095 |
| 2017/0013131 A1* | 1/2017 | Craib .................. | G06Q 30/016 |
| 2022/0086686 A1 | 3/2022 | Sorond et al. | |
| 2022/0326995 A1 | 10/2022 | Wang et al. | |

(Continued)

FOREIGN PATENT DOCUMENTS

| | | | | | |
|---|---|---|---|---|---|
| CN | 116264726 A | * | 6/2023 | .............. | G06N 3/02 |
| DE | 3930040 A | * | 3/1991 | ............. | H04L 12/52 |

(Continued)

OTHER PUBLICATIONS

Dhaval Mehta et al., "Disaggregated Application on a RAN Controlled via RIC Platform," U.S. Appl. No. 18/505,384, filed Nov. 9, 2023. (24 Pages).

(Continued)

*Primary Examiner* — David R Lazaro
*Assistant Examiner* — Mariegeorges A Henry
(74) *Attorney, Agent, or Firm* — Jeremiah J. Baunach; Frontier IP Law PLLC

(57) ABSTRACT
A method of using a RAN intelligent controller (RIC) platform extension may include (i receiving a network function from a RIC platform, the network function including an intent, (ii) determining the intent of the network function, (iii) generating a response to the network function based on the intent, wherein the response to the network function includes configuration data for one or more network vendor services, (iv) determining one or more parameters for the one or more network vendor services using network function adapters, and (v) sending the configuration data to the one or more network vendor services using the one or more determined parameters.

20 Claims, 5 Drawing Sheets

400

Receive a network function including an intent from RIC platform
402

Determine intent of network function
404

Generate response to network function based on intent, response includes configuration data for network vendor services
406

Determine parameters for network vendor services using network function adapters
408

Send configuration data to network vendor services using determined parameters
410

(56)                    References Cited

U.S. PATENT DOCUMENTS

| 2023/0188607 | A1 |   | 6/2023 | Tangirala et al. |   |
|---|---|---|---|---|---|
| 2024/0098568 | A1 | * | 3/2024 | Curic | ............... H04W 28/0925 |
| 2024/0163649 | A1 |   | 5/2024 | Akman et al. |   |
| 2024/0251321 | A1 |   | 7/2024 | Mcdonald et al. |   |

FOREIGN PATENT DOCUMENTS

| WO | WO-2019072147 | A1 | * | 4/2019 | ......... H04L 41/0806 |
|---|---|---|---|---|---|
| WO | 2023/283102 | A1 |   | 1/2023 |   |
| WO | 2023/028310 | A1 |   | 3/2023 |   |
| WO | 2023/172292 | A2 |   | 9/2023 |   |

OTHER PUBLICATIONS

Dhaval Mehta et al., "Multi-Tenant RIC Applications on RAN Controlled via RIC Platform," U.S. Appl. No. 18/524,647, filed Nov. 30, 2023. (26 Pages).

Brik, B., et al., "A Survey on Explainable AI for 6G O-RAN: Architecture Use Cases, Challenges and Research Directions", arxiv.org, Jul. 1, 2023, 14 pages.
International Search Report and Written Opinion received for PCT Patent Application No. PCT/US24/55104, mailed on Feb. 13, 2025, 10 pages.
International Search Report and Written Opinion received for PCT Patent Application No. PCT/US24/56269, mailed on Feb. 7, 2025, 12 pages.
Rahman, T. F., et al., "O-RAN Perspective on Industrial Internet of Things: A SWOT Analysis", 2023 IEEE International Conference on Industrial Technology (ICIT), Apr. 4, 2023, pp. 1-6.
Whitepaper, A., et al., "Deutsche Telekom And Partners Demonstrate Non-Real Time Ran Optimization In A Multi-Vendor Environment", Sep. 1, 2023, 25 pages.

* cited by examiner

Service Management and Orchestration Framework (SMO) 102

Non-Real Time RAN Intelligent Controller (RIC) 104

Near-Real Time RAN Intelligent Controller (RIC) 106

O-CU-CP 110

O-CU-UP 112

O-eNB 108

O-DU 114

O-RU 116

O-Cloud 118

X2-c

X2-u

NG-u

Xn-u

Xn-c

NG-c

F1-u

F1-c

O1

A1

E1

E2

E2

E2

E2

O1

O2

400

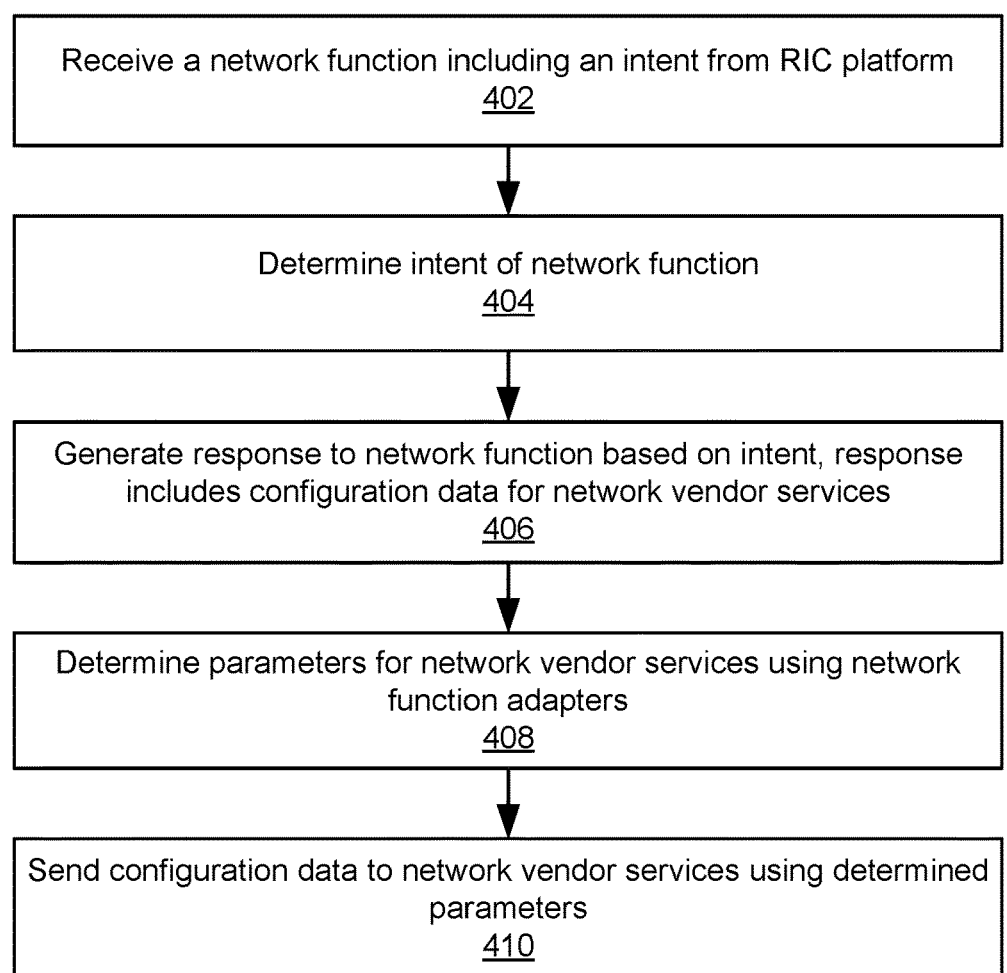

Receive a network function including an intent from RIC platform
402

Determine intent of network function
404

Generate response to network function based on intent, response includes configuration data for network vendor services
406

Determine parameters for network vendor services using network function adapters
408

Send configuration data to network vendor services using determined parameters
410

Figure 4

RIC ARCHITECTURE WITH PLATFORM EXTENSION AND ADAPTERS

BRIEF SUMMARY

This disclosure is generally directed to platform extensions with vendor adapters on a Radio Access Network (RAN) controlled via RAN intelligent controller (RIC) platforms in the context of a telecommunications network where the RIC is able to communicate with the platform extension and adapters to provide network functions for different vendors services. Historically, a RAN intelligent controller (RIC) was a software-defined component of the open radio access network (O-RAN) that was responsible for controlling and optimizing RAN functions. The O-RAN set a standard for virtual RAN run on standard servers. However, the O-RAN standard did not define exactly how to interface from the RIC platform to network functions for different vendor services or the implementation perspective of the RIC for operations or vendor perspectives. As such, the historical RIC functions were unable to efficiently provide information for operation and vendor perspectives outside of the RIC itself. Using platform extensions and network function adapters configured to communicate the operations of the RIC to outside network vendor services provides for efficient communication for operations and vendor perspectives. In one example, a method may include (i) receiving a network function from a RIC platform, the network function including an intent, (ii) determining the intent of the network function, (iii) generating a response to the network function based on the intent, wherein the response to the network function includes configuration data for one or more network vendor services, (iv) determining one or more parameters for the one or more network vendor services using network function adapters, and (v) sending the configuration data to the one or more network vendor services using the one or more determined parameters.

In one example, the RIC platform is a non-real time (non RT) RIC and the network function is a delay tolerant network function.

In one example, the network function is received from an rApplication (rAPP) of the non-real time RIC.

In one example, the response to the network function is generated based on one or more data adapters retrieving information from an observability framework (OBF).

In one example, the network function adapters determine the one or more parameters for the one or more network vendor services by accessing an inventory that includes vendor details.

In one example, the RIC is a near-real time RIC and the network function is a time-sensitive network function.

In one example, the network function is received from an xApplication (xAPP) of the near-real time RIC.

In one example, the network function adapters determine the one or more parameters for the one or more network vendor services by accessing an inventory that includes vendor details.

In one example, the network function adapters are within the near-real time RIC.

This application also further discloses a non-transitory computer-readable medium encoded with instructions that, when executed by a physical processor of a computing device, cause the computing device to perform the method of one or more embodiments of the method outlined above.

This application also further discloses a system configured to perform one or more of the embodiments outlined above.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

FIG. 4 shows a flowchart of an example method of using a RIC platform extension with adapters in communication with a RIC platform.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current disclosure. The phrases "in one embodiment," "in another embodiment," "in various embodiments," "in some embodiments," "in other embodiments," or "in one implementation," "in another implementation," "in various implementations," "in some implementations," "in other implementations," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
FIG. 1 shows an example open radio area network architecture including a real time RIC and a near-real time RIC.

FIG. 1 shows an illustrative architecture 100 corresponding to the open radio access network (O-RAN) architecture. In this example, the open radio access network software community (O-RAN SC) architecture follows the O-RAN alliance defined architecture. The O-RAN standard introduced a radio access network intelligent controller (RIC) and broke out the functionality of the RIC into non-real time actions that processed any delay tolerant actions and near-real time actions that covered any immediate actions.

Architecture 100 may include a service management and orchestration framework (SMO) 102, which may interface with other components of the architecture 100, such as, an Open Cloud 118 (O-Cloud) and a near-real time radio access network intelligent controller (RIC) 106. SMO 102 may further include a non-real time radio access network intelligent controller (RIC) 104. In some implementations, near-real time radio access network intelligent controller 106 may further communicate with an evolved NodeB (O-eNB) 108, which in some implementations corresponds to the hardware aspect of a 4G radio access network. Near-real time radio access network intelligent controller 106 also further interfaces with centralized units (CU), including an open centralized unit-control plane node (O-CU-CP) 110 and an open centralized unit-user plane node (O-CU-UP) 112, as well as an open distributed unit (O-DU) 114, and an open radio unit (O-RU) 116, as further shown in FIG. 1. Since the non-real time RIC 104 handles the delayed tolerant applications, the non-real time RIC 104 can communicate using the O1 interface. As shown in FIG. 1, the O1 interface is not delay sensitive, whereas, the near-real time RIC 106 is configured to control time sensitive applications and uses the E2 network interface for time-sensitive applications. In various embodiments, the technology of this disclosure may focus upon communications and interactions between O-DU 114, O-CU-CP 110, and/or O-CU-UP 112. FIG. 1 also further illustrates how architecture 100 may further include a multitude of communication lines interconnecting various ones of the components outlined above.

In the context of FIG. 1, radio access network (e.g., gNB, gNodeB, or base station) disaggregation corresponds to an initial phase of the deployment of Fifth Generation (5G) technology, and a major application will be Enhanced Mobile Broadband (eMMB). Radio access network disaggregation can be performed according to the 3rd Generation Partnership Project (3GPP) or according to the O-RAN specification illustrated in the illustrative example of FIG. 1.

In the O-RAN standard, historically, vendor controlled decisions in the network had to be brought to a centralized location for analysis. For example, using the Non-RT RIC 104, the O-RAN specifications handled delay-tolerant type applications and communications with the RAN functions using traditional original equipment manufacturer (OEM) type interfaces. Meaning that where the system was using traditional OEM type interfaces, any of the performance data needed to make changes to the configuration of the system 100 could be accessed by the various vendors. What the O-RAN standard has not defined is how exactly to interface from the RIC platform to the network functions itself, which presents challenges from an operator or vendor perspective where they may be required to interface with the network functions that generate data, such as the configuration management, inventory distributors, or other network functions. Presently, there are multiple different types of network functions that are each interacting with the RIC and might each required different interfaces to connect with the network functions.

Figure 2:
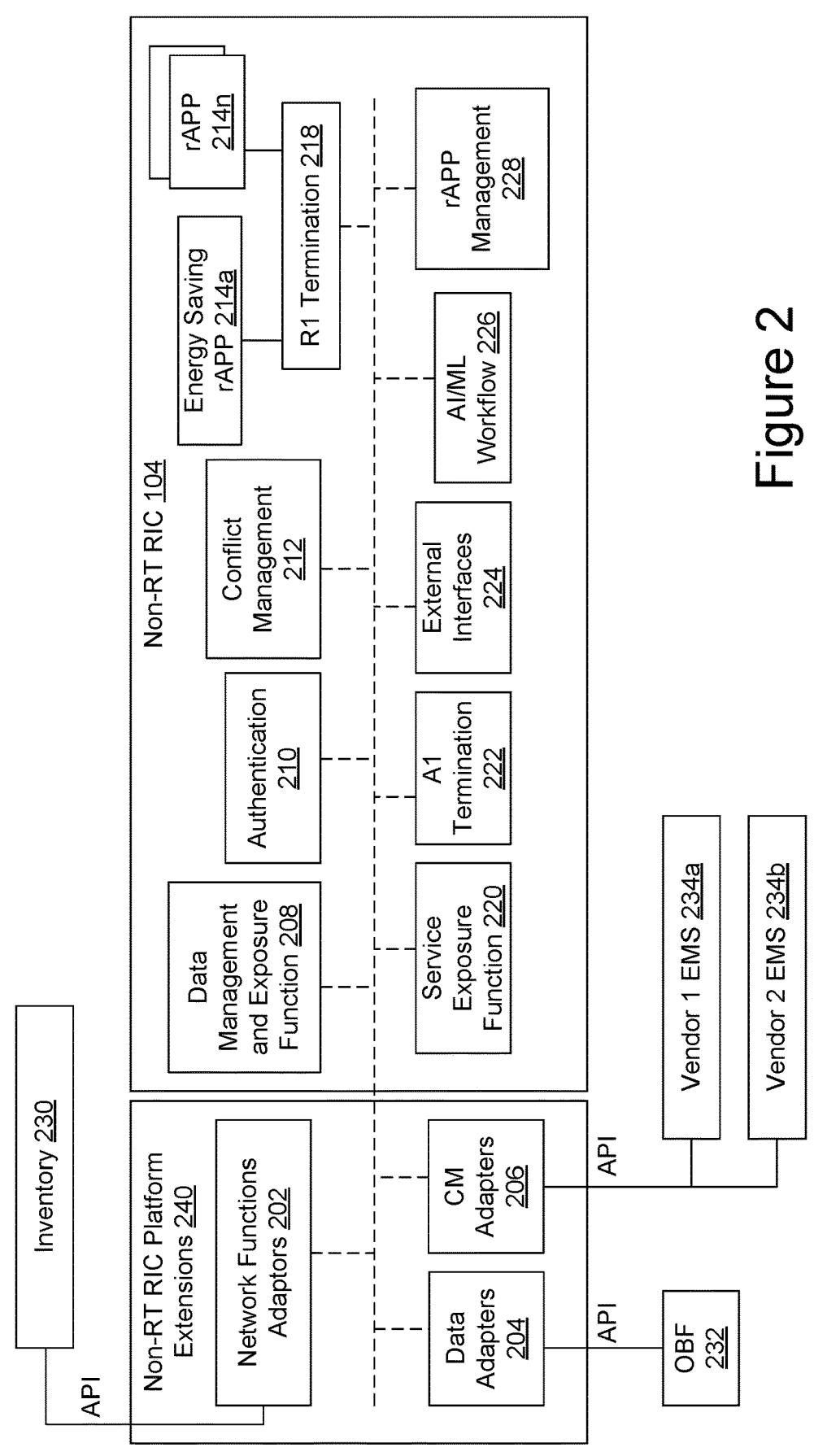
FIG. 2 shows an example of a platform extension and adapters on a non-real time RIC

FIG. 2 shows an illustrative architecture 200 of an example Non-RT RIC 104 with Non-RT RIC Platform Extensions 240. As shown, architecture 200 may include a Non-RT RIC 104 as described with respect to FIG. 1, which may interface with non-real time RIC platform extensions 240 that may adapt the portions of the Non-RT RIC 104 for various applications in the system 100. For example, in some implementations, the Non-RT RIC platform extensions 240 may include network function adapters 202, data adapters 204, and/or classification manager ("CM") adapters 206. It should be understood that other adapters to expand the capabilities of the O-RAN are also contemplated and not limited to the example Non-RT RIC platform extensions 240 included herein. As shown in the architecture 200, the Non-RT RIC 104 may include one or more functions inside the RIC platform, such as a data management and exposure function 208, an authentication function 210, a conflict management function 212, a service exposure function 220, an A1 termination 222, external interfaces 224, artificial intelligence and/or machine learning AI/ML workflow 226, rAPP management 228, R1 termination 218, and/or rAPP 214.

As shown in FIG. 2, the Non-RT RIC platform extensions 240 may be connected to the Non-RT RIC 104 and may be configured to present information to vendors without the RIC having to do any connections internally. As shown, the network functions may go through the data adapters 204, such as through the E2 lines, and bring the data back to the RIC platform where the rAPPs 214 perform the intelligence actions. An rAPP 214 may be a software tool used by the RIC to manage network functions in non-real time. In some implementations, the rAPP 214 may further send information to additional underlying sites and those sites can be managed by different vendor management systems where the rAPP 214 can decide what vendor the data management is assigned to such as by the rAPP management function 228. The rAPP 214 then sends the data to the Non-RT RIC platform extensions 240 and the data adapters 204 determines which perspectives for the vendor management systems (such as VENDOR 1 EMS 234a or VENDOR 2 EMS 234b) to setup the data for, such as specific parameters of the vendors. In some implementations, the data adapters 204 determine the perspectives or parameters using the network topologies stored in the inventory 230 and provided to the data adapters 204 using the network function adapters 202. In that example, the network function adapters 202 can talk to the inventory and whatever data is needed for the vendor perspectives can be brought into the Non-RT RIC platform extensions 240 using the network function adapters 202. In some implementations, the inventory includes network vendor services details, such as parameters and/or configurations for the network vendor services.

In one example of this data flow for providing the different vendor perspectives, an energy saving rAPP 214a may receive a request to provide site performances in a specific market and/or that are in a specific morphology that can then be used for an intent, such as energy saving in the specific market, etc. The rAPP 214a can send that information out of the Non-RT RIC 104 to the Non-RT RIC platform extensions 240. The information sent from the rAPP can include the intent of the rAPP where the intent can be converted into an action that is sent out to the different components of the Non-RT RIC platform extensions 240. In this example, the Non-RT RIC platform extensions 240 can determine based on the information and the intent of the rAPP 214a that a list of cities in that specific market and/or with that specific morphology need to be generated and/or analyzed. The data adapter 204 may then go to the observability framework (OBF) 232 and request data related to the list of cities in that specific market and/or with that specific morphology. In some implementations, the OBF 232 collect telemetry data from network functions that enable the use of artificial intelligence and/or machine learning to optimize and operate the network. The data adapter 204 can then provide the generated list to the rAPP 214a and the rAPP 214a can further refine the intent into an action, such as to shut down specific sites for energy efficiency. For example, the generated list may show that out of 100 sites in the specific market, 50 of those sites can be shut down from 2:00 pm-3:00 pm to satisfy the intent of energy saving. The rAPP 214a may then use the Non-RT RIC platform extensions 240 to perform a network action, such as to shut down the 50 sites during the time period using the classification manager (CM) adapter 206. The CM adapter 206 may review the network action and determine which network actions go with which network vendors. In this example, the CM adapter 206 may determine that a first portion of the 50 sites, such as sites 1-20 are with a first Vendor 1 and a second portion of the 50 sites, such as sites 21-50 are with a second Vendor 2. The CM adapter 206 can get the intent from the rAPP 214a and encodes the intent as a network action into the right parameters for each vendor based on the network function adapters 202 retrieving the relevant vendor parameters from the inventory 230. The CM adapter 206 may then provide the network actions to the relevant vendor, such as by having Vendor 1 EMS 234a shut down sites 1-20 and having Vendor 2 EMS 234b shut down sites 21-50.

As shown, the CM adapter 206 may provide any of the various network actions to different vendors with different parameters based on the Non-RT RIC platform extension 240 determining the intent of the rAPP and turning that into network actions that can be communicated to different vendors separate from the non-RT RIC 104. As shown, the network function adapters 202 can bring in any external information into the Non-RT RIC platform extensions 240 itself. So the network function adapters 240 can connect to both the inventory 230 and/or any external services that can be leveraged to bring those services back into the RIC framework.

Figure 3:
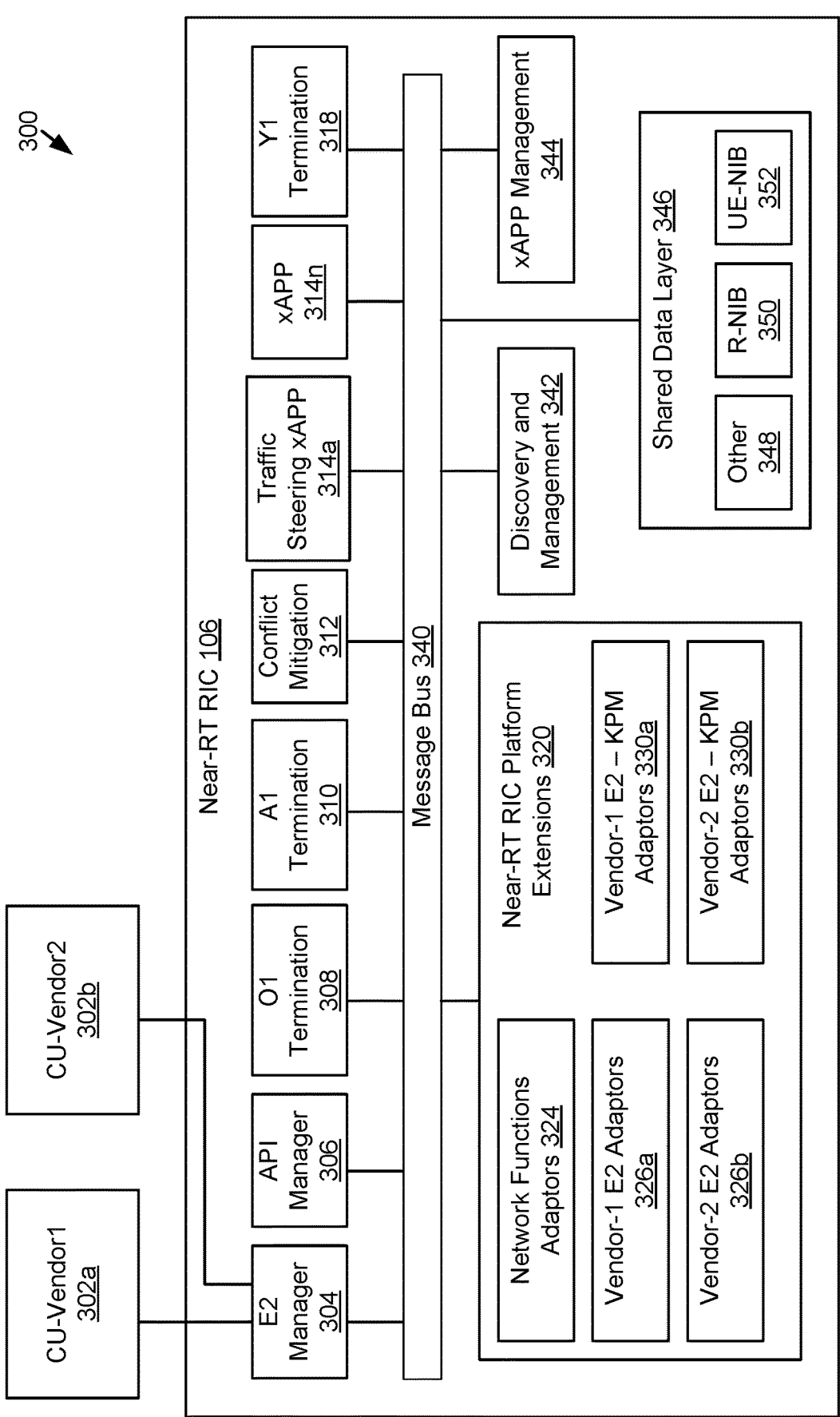
FIG. 3 shows an example of a platform extension and adapters on a near-real time RIC.

As shown in FIG. 2, the Non-RT RIC platform extensions 240 may be separate from the Non-RT RIC 104, as the Non-RT RIC 104 is dealing with delay tolerant applications and does not have specific speed considerations. However, in some implementations, the Non-RT RIC platform extensions 240 may also included within the Non-RT RIC 104, similar to the Near RT-RIC platform extensions 320 present within the Near-RT RIC 106 as shown in FIG. 3. As shown in FIG. 2, the Non-RT RIC platform extensions 240 can send information to and from the other services using an API that connects on the O1 delay tolerant connections. In some implementations, the components of the Non-RT RIC platform extensions 240 can use artificial intelligence and/or machine learning over time to refine the requests for data, generate responses to network functions, determine intent, and/or determine parameters for vendors based on historical data and training models.

FIG. 3 shows an illustrative architecture 300 of an example Near-RT RIC 106 with Near-RT RIC Platform Extensions 320. As shown, architecture 300 may include a Near-RT RIC 106 as described with respect to FIG. 1, which may interface with near-real time RIC platform extensions 320 located within the Near-RT RIC 106 that may adapt the portions of the near-real time RIC 106 for various applications in the system 100. For example, in some implementations, the Near-RT RIC platform extensions 320 may include network function adapters 324, vendor specific E2 adapters 326, and/or vendor specific E2 key performance metric (E2-KPM) adapters 330. It should be understood that other adapters to expand the capabilities of the O-RAN are also contemplated and not limited to the example Near-RT RIC platform extensions 320 included herein. As shown in the architecture 300, the Near-RT RIC 106 may include one or more functions inside the RIC platform, such as an E2 manager 304, an application program interface (API) manager 306, a O1 termination 308, an A1 termination 310, a conflict mitigation 312, one or more xAPPs 314, a Y1 termination, discovery and management 342, xAPP management, and/or a shared data layer 346 including one or more of other 348, radio—network information base (R-NIB) 350, and/or user element—network information base (UE-NIB) 352. As shown in FIG. 3, the various components E2 Manager 304, API Manager 306, O1 termination 308, A1 termination 310, and/or Y1 termination 318 allow for data flow to and from the various data lines shown in system 100 in FIG. 1.

As shown in FIG. 3, the Near-RT RIC platform extensions 320 may reside within the Near-RT RIC 106 and may be configured to provide connection parameters for the various CU-Vendor 302 without the other applications on the Near-RT RIC 106 having to do any connection parameter decisions. As shown, the network functions may go through Vendor E2 Adapters 326 and/or the Vendor E2-KPM Adapters 330 to provide the information through the E2 manager 304 to the various CU vendor 302. An xAPP 314 may be a software tool used by the RIC to manage network functions in near-real time. In some implementations, the xAPP 314 may send network functions to the Near RT RIC platform extensions 320 and the platform extensions 320 may determine an intent of the network function from the xAPP, such as by determining which xAPP 314 the network function came from (e.g., the traffic steering xAPP 314a may have an intent for the platform extensions 320 to steer traffic to different CU vendors 302, etc.). The platform extensions 320 may then generate a response to the network function based on the intent, such as which vendors to change the traffic to based on traffic load, etc. The network extensions 320 may then determine parameters for different vendor services to allow for the network function to be sent to those vendors. The parameters may be determined by the specific Vendor E2 Adapters 326 and/or the Vendor E2-KPM Adapters 330.

In one example of this data flow for providing the different vendor perspectives, an traffic steering xAPP 314a may receive a request to improve the data flow in network with slow performance and the xAPP 314a may send a request to the Near-RT RIC platform extensions 320 to begin analyzing and steering traffic in a specific network to improve speeds, etc. The information sent from the traffic steering xAPP 314a can include the intent of the xAPP where the intent can be converted into an action that is sent out to the different components of the Near-RT RIC platform extensions 320. In this example, the Near-RT RIC platform extensions 320 can determine based on the information and the intent of the traffic steering xAPP 314a that traffic steering and rerouting of traffic to different vendors is the intent based on the type of xAPP that is making the network request and/or the context of the request. The network function adapters 324 can then being analyzing the traffic on the network in substantially real-time and rerouting the request to various vendors to execute the traffic steering network request. As the traffic is rerouted to different vendors, the network function adapters 324 can determine the parameters for the various vendors and send out the requests on the Vendor E2 Adapters 326 and/or the Vendor E2-KPM adapters 330 in order for the traffic steering requests to match the configurations of the different vendors, such as CU-Vendor 1 302a and/or CU-Vendor 2 302b which may have different configurations and parameters for network requests and/or connections.

As shown in FIG. 3, the Near-RT RIC platform extensions 320 can send information to and from the other services using an E2 manager 304 to send communications on the E2 signal line in substantially or near-real time. In some implementations, the components of the Near-RT RIC platform extensions 320 can use artificial intelligence and/or machine learning over time to refine the requests for data, generate responses to network functions, determine intent, and/or determine parameters for vendors based on historical data and training models. In some implementations, as shown in FIG. 3, the Near-RT RIC platform extensions 320 are included to support different vendor RAN functions, since each RAN function may be supporting different feature sets and in some implementations the E2 KPM adapters 330 bridge the gap to help bring external information into the RAN platform itself.

FIG. 4 shows a flowchart 400 of an example method of using a RIC platform extension to steer data to vendors of the RIC platform. At 402, the RIC platform, such as the Non-Real Time RIC 104 or the Near-Real Time RIC 106, of a telecommunications network, such as in system 100 of FIG. 1, may send a network function, such as from an rAPP 214 and/or xAPP 314 depending on whether the RIC platform is as the Non-Real Time RIC 104 or the Near-Real Time RIC 106. In some implementations, the network functions may include an intent or context that allows the platform extensions to determine what actions to take for the network request to send information to various vendors. For example, the intent may be a energy saving request or a traffic steering request based on a type of rAPP 214 and/or xAPP 314 that is sending the request as described elsewhere herein. AT 404, network extensions may determine an intent of network function received from the RIC platform. For example, the intent may be determined based on a type of the rAPP 214 and/or xAPP 314 that is sending the request or the intent may be determined based on the network function itself and a context of the network function request. In some implementations, the intent may be determined by the rAPP 214 and/or xAPP 314 and provided as a set of instructions to the network extensions, while in further implementations the network extensions may determine at least a portion of the intent from the network request. In some implementations, the network extensions and/or the rAPP 214 and/or xAPP 314 may determine the intent of the network functions using machine learning algorithms that update over time based on historical data and or training models in order to achieve more efficient and/or relevant determinations over time.

At 406 the network extensions may then generate a response to the network function based on the intent. For example, if the request is for site performance in specific cities, the data adapters 204 and/or other portions of the network extensions can retrieve operation data of the sites in the specific cites from databases or OBF 232 that may be external to the RIC platform and return that information as a generated response for the rAPP 214 and/or xAPP 314 to receive. In some implementations, the generated response may also include configuration data for one or more network vendor services. For example, as part of the generated response, the network extensions may determine configuration data, such as an action like changing traffic to a site, shutting down a site, etc. that includes sending information to a vendor service outside of the RIC platform. The vendor service outside of the RIC platform may have different parameters for sending configuration data. At 408, the network function adapters 202/324 can determine what the parameters are for each of the network vendor services that will be receiving communications based on the network function. The parameters include how to change the network function request to align with the configuration data for each of the network vendor services, such that each of the vendor network services can understand and/or execute the network function and/or configuration data without having the RAN platform provide any specific parameters for each of the vendors. At 410, the network extensions send the configuration data to the network vendor services using the one or more parameters that allow each of the network vendor services to execute the configuration data, such as turning sites on/off, rerouting traffic, saving energy, etc. This allows the RIC platform to execute network functions independent of which vendor services are being used and the network extensions interpret the network function and align the parameters of each vendor to receive the network functions as needed.

Figure 5:
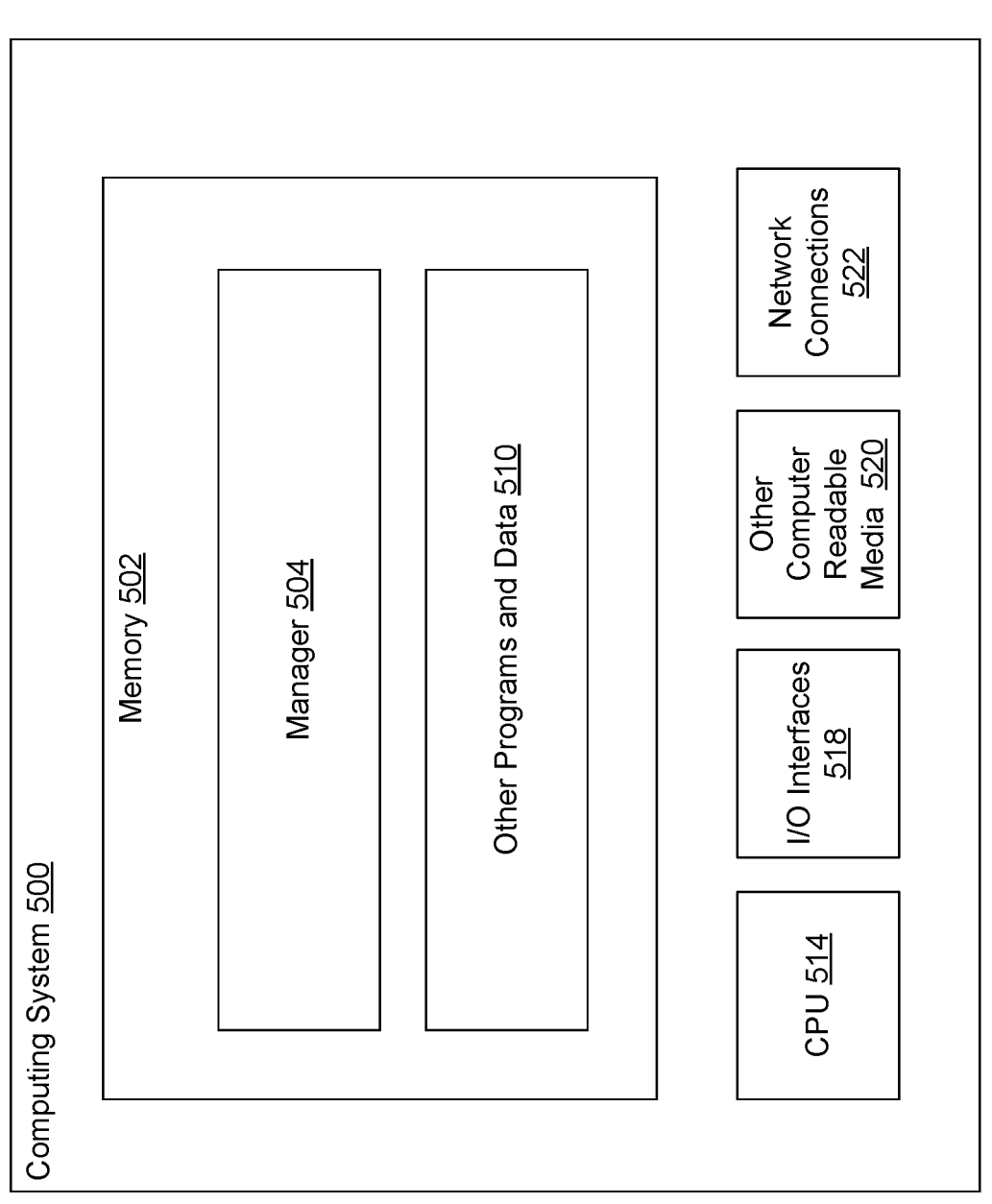
FIG. 5 shows a system diagram that illustrates an example computing system that implements and/or comprises one or more components of a system that implements platform extensions and adapters with a RAN controlled via RIC.

FIG. 5 shows a system diagram that illustrates an example computing system 500 that implements and/or comprises one or more components of a system that implements platform extensions on a RAN controlled via RIC platform as described herein.

In various embodiments, the computing system 500 can be implemented either as network elements on dedicated hardware, as a software instance running on dedicated hardware, or as a virtualized function instantiated on an appropriate platform, e.g., a cloud infrastructure. In some embodiments, many operations and functionality of such systems may be completely software-based and designed as cloud-native, meaning that they're agnostic to the underlying cloud infrastructure, allowing higher deployment agility and flexibility. Accordingly, various embodiments described herein may be implemented in software, hardware, firmware, or in some combination thereof. Computing system 500 may include memory 502, one or more central processing units (CPUs) 514, I/O interfaces 518, other computer-readable media 520, and network connections 522.

Memory 502 may include one or more various types of non-volatile and/or volatile storage technologies. Examples of memory 502 may include, but are not limited to, flash memory, hard disk drives, optical drives, solid-state drives, various types of random access memory (RAM), various types of read-only memory (ROM), other computer-readable storage media (also referred to as processor-readable storage media), non-transitory computer-readable medium, or the like, or any combination thereof. Memory 502 may be utilized to store information, including computer-readable instructions that are utilized by CPU 514 to perform actions, including embodiments described herein.

Memory 502 may have stored thereon access manager 504. The manager 504 is configured to implement and/or perform various control functions to implement operations of the platform extensions of the RAN controlled via the RIC platform described herein, such as with one or more processors. Memory 502 may also store other programs and data 510, which may include control systems for functionality for the cellular wireless telecommunication network, control systems for amplifying, digitizing, transmitting and receiving RF signals associated with radio towers for the cellular wireless telecommunication network, performance statistics, network interference management and statistics, quality of service management and statistics, throughput statistics, databases, user interfaces, operating systems, other network management functions, other NFs, etc.

Network connections 522 are configured to communicate with other computing devices, telecommunication equipment, computer network equipment and/or radio antennas, to perform operations of the computing system 500. In various embodiments, the network connections 522 may include transmitters and receivers to send and receive data as described herein; hardware that implements functionality of the platform extensions of the RAN controlled via the RIC platform for the cellular wireless telecommunication network; hardware that implements systems for amplifying, digitizing, transmitting and receiving the RF signals associated with radio towers for the cellular wireless telecommunication network; radio hardware including one or more amplifiers, filters, analog-to-digital (A/D) converters, wiring, antennas and base-station towers and/or interfaces thereto; etc.

I/O interfaces 518 may include video interfaces, other data input or output interfaces, or the like. In some embodiments, I/O interfaces 518 may include transmitters and receivers to send and receive data as described herein; hardware that implements systems for functionality of the platform extensions of the RAN controlled via the RIC platform for the cellular wireless telecommunication network; hardware that implements systems for amplifying, digitizing, transmitting and receiving the RF signals associated with radio towers for the cellular wireless telecommunication network; radio hardware including one or more amplifiers, filters, analog-to-digital (A/D) converters, wiring, antennas and base-station towers and/or interfaces thereto; etc.

Other computer-readable media 520 may include other types of stationary or removable computer-readable media, such as removable flash drives, external hard drives, or the like.

In some embodiments, one or more special-purpose computing systems may be used to implement systems of the manager 504. Accordingly, various embodiments described herein may be implemented in software, hardware, firmware, or in some combination thereof.

The various embodiments described above can be combined to provide further embodiments. These and other changes can be made to the embodiments and implementations in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of using a RIC platform extension comprising:

receiving a network function from a RAN intelligent controller (RIC) application of a RIC platform at a near RT RIC platform extension, the network function including an intent;

the near RT RIC platform extension determining the intent of the network function, including determining which RIC application of a RIC platform the network function came from;

generating a response to the network function based on the intent, wherein the response to the network function includes configuration data for one or more network vendor services;

determining one or more parameters for the one or more network vendor services using network function adapters; and sending the configuration data to the one or more network vendor services using the one or more determined parameters, including encoding the intent as a network action into the determined parameters for each of the one or more vendor services based on the network function adapters retrieving relevant vendor parameters from an inventory.

2. The method of claim 1, wherein the RIC platform is a non-real time RIC and the network function is a delay tolerant network function.

3. The method of claim 2, wherein the network function is received from an rAPP of the non-real time RIC.

4. The method of claim 2, wherein the response to the network function is generated based on one or more data adapters retrieving information from an observability framework (OBF).

5. The method of claim 2, wherein the network function adapters determine the one or more parameters for the one or more network vendor services by accessing an inventory that includes vendor details.

6. The method of claim 1, wherein the RIC is a near-real time RIC and the network function is a time-sensitive network function.

7. The method of claim 6, wherein the network function is received from an xAPP of the near-real time RIC.

8. The method of claim 6, wherein the network function adapters determine the one or more parameters for the one or more network vendor services by accessing an inventory that includes vendor details.

9. The method of claim 6, wherein the network function adapters are within the near-real time RIC.

10. A non-transitory computer-readable medium encoding instructions that, when executed by at least one physical processor of a computing device, cause the computing device to perform a method comprising:

receiving at a RAN intelligent controller (RIC) platform extension, a network function from a RIC application of a RIC platform, the network function including an intent;

the RIC platform extension determining the intent of the network function, including determining which RIC application of a RIC platform the network function came from;

generating a response to the network function based on the intent, wherein the response to the network function includes configuration data for one or more network vendor services;

determining one or more parameters for the one or more network vendor services using network function adapters of the RIC platform extension; and sending the configuration data to the one or more network vendor services using the one or more determined parameters, including encoding the intent as a network action into the determined parameters for each of the one or more vendor services based on the network function adapters retrieving relevant vendor parameters from an inventory.

11. The non-transitory computer-readable medium of claim 10, wherein the RIC platform is a non-real time RIC and the network function is a delay tolerant network function.

12. The non-transitory computer-readable medium of claim 11, wherein the network function is received from an rAPP of the non-real time RIC.

13. The non-transitory computer-readable medium of claim 11, wherein the response to the network function is generated based on one or more data adapters retrieving information from an observability framework (OBF).

14. The non-transitory computer-readable medium of claim 11, wherein the network function adapters determine the one or more parameters for the one or more network vendor services by accessing an inventory that includes vendor details.

15. The non-transitory computer-readable medium of claim 10, wherein the RIC is a near-real time RIC and the network function is a time-sensitive network function.

16. The non-transitory computer-readable medium of claim 15, wherein the network function is received from an xAPP of the near-real time RIC.

17. The non-transitory computer-readable medium of claim 15, wherein the network function adapters are within the near-real time RIC.

18. A system comprising:
a RAN intelligent controller (RIC) within a telecommunications network; and
a RIC platform extension configured to communicate with the RIC within the telecommunications network;

wherein the RIC and the RIC platform extension are configured to perform operations, the operations including:
receiving a network function from a RIC application of a RIC platform at the RIC platform extension, the network function including an intent;
the RIC platform extension determining the intent of the network function, including determining which RIC application of a RIC platform the network function came from;
generating a response to the network function based on the intent, wherein the response to the network function includes configuration data for one or more network vendor services;
determining one or more parameters for the one or more network vendor services using network function adapters; and
sending the configuration data to the one or more network vendor services using the one or more determined parameters, including encoding the intent as a network action into the determined parameters for each of the one or more vendor services based on the network function adapters retrieving relevant vendor parameters from an inventory.

19. The system of claim 18, wherein the RIC is a non-real time RIC and the RIC platform extension is separate from the non-real time RIC.

20. The system of claim 18, wherein the RIC is a near-real time RIC and the RIC platform extension resides within the near-real time RIC.

* * * * *